United States Patent [19]

Ueda et al.

[11] Patent Number: 4,824,724

[45] Date of Patent: Apr. 25, 1989

[54] MAGNETIC RECORDING MEDIUM

[75] Inventors: Kunihiro Ueda; Yasufumi Takasugi; Masatoshi Nakayama, all of Nagano, Japan

[73] Assignee: TDK Corporation, Tokyo, Japan

[21] Appl. No.: 868,511

[22] Filed: May 30, 1986

[30] Foreign Application Priority Data

| Jun. 5, 1985 | [JP] | Japan | 60-121666 |
| Jun. 6, 1985 | [JP] | Japan | 60-123368 |
| Jun. 7, 1985 | [JP] | Japan | 60-123737 |

[51] Int. Cl.$^4$ .............................................. G11B 5/64
[52] U.S. Cl. .................................. 428/336; 204/192.2; 204/192.31; 427/131; 427/132; 428/422; 428/694; 428/695; 428/900
[58] Field of Search ................. 427/131, 132, 44, 128; 428/695, 900, 422, 336, 694; 204/192.2, 192.31

[56] References Cited

U.S. PATENT DOCUMENTS

| 4,260,466 | 4/1981 | Shirahata | 427/132 |
| 4,390,601 | 6/1983 | Ono | 427/132 |
| 4,419,404 | 12/1983 | Arai | 428/900 |
| 4,429,024 | 1/1984 | Ueno | 428/900 |
| 4,495,242 | 1/1983 | Arai | 428/695 |
| 4,521,482 | 6/1985 | Arai | 427/132 |
| 4,529,651 | 7/1985 | kitoo | 428/336 |
| 4,565,734 | 1/1986 | Arai | 428/900 |
| 4,582,746 | 4/1986 | Shinahata | 428/694 |

FOREIGN PATENT DOCUMENTS 0160828  9/1984  Japan .................................. 428/422

*Primary Examiner*—Paul J. Thibodeau
*Attorney, Agent, or Firm*—Oblon, Fisher, Spivak, McClelland & Maier

[57] ABSTRACT

A magnetic recording medium is provided comprising a non-magnetic substrate, a magnetic metal layer of continuous thin film type deposited on the substrate, and a topcoat film on the magnetic layer. The topcoat film is formed by sputtering or ion plating a fluorocarbon resin so that it consists essentially of carbon and fluorine, and fluorine atoms of the topcoat film are chemically combined with metal atoms of the magnetic layer in proximity to the interface.

1 Claim, No Drawings

MAGNETIC RECORDING MEDIUM

BACKGROUND OF THE INVENTION

This invention relates to magnetic recording media, and more particularly, to an improvement in a topcoat film on magnetic recording media having a continuous thin film type magnetic layer.

In the field of magnetic recording media destined primarily for video and audio applications, active efforts have been concentrated on the development of magnetic recording media having a magnetic layer of continuous thin film type because of compactness of a roll of tape.

The preferred magnetic layers for such continuous thin film type media are films of Co, Co-Ni, Co-O, Co-Ni-O and the like deposited by the standard oblique evaporation technique wherein evaporation is effected at a predetermined angle with respect to a normal to the substrate.

Despite electromagnetic properties, the deposited magnetic layers have increased dynamic friction, low film strength, poor head contact, and in particular, low runnability or durability of tape during repeated passes, and thus produce a noticeable output drop after repeated passes. Poor corrosion resistance contributes to deterioration of many properties. In the case of video tape, the still life, that is, permissible still mode operation time is short. Many dropouts occur in the reproduction process.

To compensate for such drawbacks of deposited magnetic layers, it has been proposed to cover the layers with a variety of topcoat films. One example is a coated film of fluorocarbon resins. Prior art topcoat films of fluorocarbon resins, however, offer less satisfactory corrosion prevention and frequently produce head clogging.

SUMMARY OF THE INVENTION

Therefore, an object of the present invention is to provide a magnetic recording medium of continuous thin film type having a topcoat exhibiting improved corrosion resistance and minimized head clogging.

The present invention is directed to a magnetic recording medium comprising a non-magnetic substrate, a magnetic layer of continuous thin film type deposited on the substrate, and a topcoat on the magnetic layer.

According to a first aspect of the present invention, the topcoat is formed by sputtering a fluorocarbon resin.

According to a second aspect of the present invention, the topcoat is formed by ion plating a fluorocarbon resin.

According to a third aspect of the present invention, the topcoat film consists essentially of carbon and fluorine, and fluorine atoms of the topcoat film are chemically combined with metal atoms of the magnetic layer in proximity to the interface between the topcoat film and the magnetic layer. As the energy used in sputtering or ion plating increases, more fluorine and metal atoms are chemically combined to further enhance the adherence of the topcoat film to the magnetic layer.

DETAILED DESCRIPTION OF THE INVENTION

The detailed organization of the present invention will now be described. The magnetic recording medium of the present invention has a magnetic layer on a non-magnetic substrate.

The magnetic layers may be any continuous thin films of ferromagnetic metals. Examples of the thin film-forming ferromagnetic metal materials include ferromagnetic metals such as iron, cobalt, and nickel, and magnetic alloys such as Fe-Co, Fe-Ni, Co-Ni, Fe-Rh, Fe-Cu, Fe-Au, Co-Cu, Co-Au, Co-Y, Co-La, Co-Pr, Co-P, Co-Gd, Co-Sm, Co-Pt, Ni-Cu, Co-Ni-P, Fe-Co-Nd, Mn-Bi, Mn-Sb, Mn-Al, Fe-Co-Cr, Co-Ni-Cr, etc. Also included are those materials known to form perpendicular magnetizable films, for example, CoCr, CoV, CoNiP, CoP, MnBi, MnAlGe, NdFe, NdCo, CoO, MnSb, MnCuBi, GdFe, GdCo, PtCo, TbCo, TbFeCo, GdFeCo, TbFe$_{O3}$, GdIG (gadolinium iron garnet), GdTbFe, GdTbFeCoBi, CoFe$_2$O$_4$, etc. The magnetic layers may be formed on the substrate directly or through an undercoat layer by any desired metallizing techniques including vacuum deposition, sputtering, ion plating, and plating processes.

Preferably, the magnetic layers used in the practice of the present invention contain cobalt (Co) as an essential element and at least one element selected from nickel (Ni), chromium (Cr), and oxygen (O) as an optional element. The magnetic layers may preferably consist essentially of Co, Co +Ni, Co +O, or Co +Ni +O. That is, they may consist essentially of Co alone or Co and Ni. When they are formed from cobalt and nickel, the weight ratio of Co/Ni is preferably 1.5 or higher. In addition to Co alone or Co plus Ni, the magnetic layer may contain oxygen (O) atoms with the results of better electromagnetic properties and runnability. Preferably, the atomic ratio of O/Co (when nickel free) or 0/(Co +Ni) is up to 0.6 and especially ranges from 0.15 to 0.5.

Better results are obtained when the magnetic layers contain chromium (Cr) in addition to Co, Co +Ni, Co +O, or Co +Ni +O. Electromagnetic propertees, output, S/N ratio, and film strength are then improved. Preferably, the weight ratio of Cr/Co (when nickel free) or Cr/(Co +Ni) ranges from 0.001 to 0.1, especially from 0.005 to 0.05.

The magnetic layers may further contain trace amounts of other elements, for example, transition metal elements such as Fe, Mn, V, Zr, Nb, Ta, Mo, W, Ti, Cu, Zn, etc.

The magnetic layers preferably consist of coalesced particles of columnar crystal structure each directed at an angle with respect to a normal to the major surface of the substrate because of better electromagnetic properties. Preferably, the particles of columnar crystal structure are at an angle between 20° and 60° with respect to a normal to the major surface of the substrate. In general, they have a length extending throughout the magnetic layer in its thickness direction and a breadth of the order of 50 to 500 Å. Cobalt and optional elements of Ni and Cr form columnar crystal themselves while oxygen (O) atoms, when added, are present in the form of oxides on the surface of each columnar crystal.

The magnetic layers are generally formed to a thickness of about 0.05 μm to 0.5 μm.

As previously mentioned, the magnetic layers may be formed on the substrate directly or through an undercoat layer. They are generally formed as a monolithic layer, but may be formed from a plurality of plies with or without an intermediate ply. The most common process for forming the magnetic layers is an oblique evaporation technique. The standard oblique evaporation technique may be employed wherein the minimum incident angle with respect to a normal to the substrate is preferably at least 30°. Well-known evaporation conditions may be employed and any suitable post treatment may be carried out if necessary. One useful post treatment is a post treatment for the introduction of oxygen which may be conducted in various ways.

Topcoat films containing fluorine and carbon are formed on the magnetic layers by sputtering and ion plating processes using a fluorocarbon resin as a source material.

First, the sputtering process will be described. The sputtering process may be further classified into plasma sputtering and ion beam sputtering depending on the region where operation is conducted.

In the plasma sputtering process, an abnormal glow discharge is generated in an atmosphere of an inert gas such as argon, a target of source material to be evaporated is sputtered with the resulting Ar ions, and the thus generated vapor of source material is deposited or condensed on the substrate. Included are a DC sputtering technique wherein a DC voltage of several kilovolts is applied and a high frequency sputtering technique wherein a high frequency power of several hundreds watts to several kilowatts is applied. A magnetron type sputtering technique is also useful wherein a multi-pole sputtering equipment such as two, three or four pole sputtering equipment is used, and electromagnetic fields are applied in two perpendicular directions to impart a cycloidal motion to electrons in the plasma, as by a magnetron, to form a high density plasma, thereby reducing the voltage applied and improving the sputtering efficiency. If desired, instead of a pure inert gas atmosphere such as argon, there may be used reactive sputtering wherein sputtering is carried out in an atmosphere containing $F_2$ or $CF_4$ in admixture with argon and chemical sputtering using an atmosphere containing an active gas such as $O_2$ and $N_2$ in admixture with argon.

In the ion beam sputtering process, argon (Ar) or the like is ionized using a suitable ionization source. The ionized Ar is driven out as an ion beam in a high vacuum by applying a negative high voltage across driving electrodes. The ion beam is impinged on the surface of a target of source material to be evaporated. The resulting vapor of source material is deposited or condensed on the substrate.

These sputtering processes impart particles of source material with a kinetic energy of about several eV (electron volts) to about 100 eV which is substantially greater than the kinetic energy of about 0.1 eV to about 1 eV given by the evaporation processes.

Next, the ion plating process is an atomic film forming process wherein evaporated material ions having a sufficient kinetic energy are bombarded on the surface of a substrate before and during formation of a film thereon. The basic functions involved are sputtering, heating and ion implantation of the substrate by bombarding ions, which affect the adherence, nucleation and growth of a film being deposited. The ion plating process may be further classified into plasma and ion beam processes depending on the region where operation is carried out.

In the plasma ion plating process, a substrate held at a negative potential is cleaned by impinging Ar+ or similar cations thereon under a DC glow discharge, and an evaporation source is then heated to evaporate the source material which is ionized in the plasma. The resulting source material ions are accelerated under an electric field of increased intensity in a cathodic dark region of the glow discharge surrounding the substrate and then bombarded on the substrate with a high energy, whereby the material deposits on the substrate. Any techniques of plasma ion plating may be employed including DC application, high frequency excitation, and their combination, and their combination with various heating modes of the evaporation source. A plasma electron beam technique using a hollow cathode plasma electron gun may also be employed.

In the ion beam plating process, a source material is converted into ions by any ion producing means including sputtering, electron bombardment, or modified duoplasmatron equipment. The resulting vapor of source material ions is driven out into a high vacuum region under a controlled accelerating voltage to successively carry out cleaning and deposition on the surface of a substrate. A cluster ion beam technique for evaporation and crystal growth may also be employed wherein a jet of source material is injected from a crucible into a high vacuum through an injection nozzle to form a cluster containing $10^2$ to $10^3$ loosely combined atoms by utilizing an overcooling phenomenon due to adiabatic expansion.

The kinetic energy imparted to ions by ion plating is in the range of from about several ten eV to about 5000 eV, which is greatly higher than that given by dry coating processes, for example, evaporation process (about 0.1 eV to about 1 eV) and sputtering process (about several eV to about 100 eV). For this reason, the film deposited by ion plating exhibits an outstandingly increased adherence. An increased rate of deposition completes film formation within a short time.

A recently developed arc discharge ion plating technique involving thermionic ionization may also be used. The arc discharge ion plating technique includes heating an evaporation source to form a stream of vapor, impinging electrons emitted from a thermionic emission source against the vapor stream at a position near the evaporation source where the vapor stream is relatively dense, thereby ionizing the vapor stream, and focusing the ionized vapor stream under an electric or magnetic field at a substrate in a direction perpendicular thereto.

If the topcoat is formed by coating a fluorocarbon resin rather than the sputtering or ion plating according to the present invention, then not only it is difficult to form a thin coating to a uniform thickness, but also none of the benefits of the present invention are obtained because no fluorine-metal chemical bond is formed.

In the practice of sputtering and ion plating, the target or source material used is a fluorocarbon resin having a composition corresponding to the desired topcoat film composition. Because of increased productivity, it is preferred to carry out sputtering or ion plating of fluorocarbon in the same vacuum tank or on the same line as the magnetic layer is formed.

The fluorocarbon resins used as the target in sputtering or as the evaporation source in ion plating include polytetrafluoroethylene (PTFE), polychlorotrifluoroethylene (PCTFE), polyvinylidene fluoride (PVdF), polyvinyl fluoride (PVF), tetrafluoroethylene-hexafluoropropylene copolymers (FEP), tetrafluoroethylene-ethylene copolymers (ETFE), tetrafluoroethylene-perfluoroalkylvinyl ether copolymers (PFA), chlorotrifluoroethylene-ethylene copolymers (ECTFE), etc. The fluorocarbon resins used as the target or evaporation source preferably have an average degree of polymerization of about 700 to 3,000. Their fluorine content preferably ranges from about 30 to 80 mol% per average recurring unit.

The topcoat films formed by the sputtering or ion plating of fluorocarbon resins have an atomic ratio of fluorine to carbon in the range between 0.5 and 3, preferably between 1.2 and 2.0. The atomic ratio of fluorine/carbon does not exceed 3. With atomic ratios of less than 0.5, the polymer decomposes to an excessive extent during film formation, resulting in a less durable film unacceptable as the topcoat. Such decomposition is probably due to the inhibited chemical shift of fluorine atoms in proximity to the interface between the magnetic layer and the topcoat film. The topcoat films ay contain hydrogen, chlorine and the like in amounts of less than 10 mol%.

The atomic ratio of fluorine/carbon may vary in a thickness direction of the topcoat films. Preferably, fluorine is richer in a surface portion of the topcoat films.

The topcoat film may be a monolithic film or consist of two or more sputtered and/or ion plated plies using two or more different fluorocarbon resins. The composition of the topcoat films may be identified by IR spectroscopy and ESCA (electron spectroscopy for chemical analysis), for example.

According to the preferred embodiment of the present invention, atoms of fluorine, one component of the topcoat film are chemically combined with atoms of a metal (such as Co, Ni, Cr, and Fe), one or sole component of the magnetic layer in proximity to the interface between the topcoat film and the magnetic layer. The topcoat film then has an increased strength of bond to the underlying magnetic layer. The chemical bond also contributes to corrosion resistance.

The fluorine-metal chemical bond near the interface can be confirmed by an advanced analysis method as described below. The topcoat film is analyzed by ESCA preferably with concurrent ion etching. As the analysis proceeds across the interface between the magnetic layer and the topcoat film, the count of carbon atoms in the film is suddenly reduced and the count of metal atoms is suddenly increased in inverse proportion thereto. The chemical bond of fluorinemetal is confirmed by observing the chemical shifts of Co 2P3/2 to $CoF_2$ and $CoF_3$ in proximity to the interface. These shifts develop as shoulders of peaks corresponding to Co 780.4 eV and CoO 779.7 eV. It is to be noted that the chemical shift of fluorine-carbon bond is 292.2 eV for —$CF_2$—, for example, and the chemical shift of fluorine-metal bond is 783.2 eV for $CoF_2$ and 782.6 eV for $CoF_3$, for example.

The topcoat film having a reduced thickness may be analyzed by ESCA without ion etching or milling. The count ratio of the chemccal shift of fluorine-metal bond to that of fluorine-carbon bond near the interface, that is, fluorine-metal bond ratio ranges from 0.10 to 0.80, preferably from 0.25 to 0.55. Within this range, the advantages of the present invention including adherence and corrosion resistance become more enhanced. The abovementioned fluorine-metal bond ratio may be readily determined as a ratio of integrated areas of the respective peaks.

The optimum conditions underwwhich a film is formed so as to have its fluorine atoms chemically combined with metal atoms of the underlying magnetic metal layer may be determined by due experimentation while changing the sputtering or ion plating conditions.

The thickness, fluorine/carbon atom ratio, and surface contact angle of the topcoat films being sputtered depend upon the type of resin used as the target, sputtering voltage, discharge gas, operating pressure, sputtering rate, sputtering technique, substrate-to-target distance. These parameters may be readily determined for a particular apparatus by the artisans without undue experimentation.

Generally, the sputtering voltage is 0.2 to 7 kilovolts DC or 0.3 to 10 kilowatts RF, the operating pressure is 0.1 to several Pa, and the sputtering rate is about 100 to 10,000 Å per minute. The inert gases used in sputtering include argon, krypton, and helium, with argon being usually preferred. The substrate-to-target distance generally ranges from about 7 cm to about 40 cm.

The same applied to the ion plating. That is, the thickness, fluorine/carbon atom ratio, and surface contact angle of the topcoat films being ion plated depend upon the type of resin used as the evaporation source, substrate temperature, operating pressure, ionization voltage, film depositing rate, substrate-to-hearth distance, ion plating technique, and the like. These parameters may be readily determined for a particular apparatus by the artisans without undue experimentation. Generally, the ionization voltage is 10 to 100 volts, the operating pressure is 0.01 to 1 Pa, the film depositing rate is about 50 to 500 Å per second, and the substrate temperature is about 20 to 90° C. The ion plating techniques include direct current application, high frequency application, cluster ion beam, thermionic cathode, and arc discharge techniques as previously mentioned, and any suitable choice may be made depending on the intended application of the magnetic recording media. Irrespective of any particular technique employed, a substrate on which a film is to be deposited is preferably surface cleaned and heated to an elevated temperature by argon ion bombardment. The adherence of then deposited film is improved.

It should be noted that the aforementioned fluorine-metal bond cannot be introduced by an evaporation or vacuum deposition process. Even the sputtering or ion plating process sometimes fails to create a great number of fluorine-metal bonds when the power applied or ionization voltage is low.

The topcoat films preferably have a contact angle with water in the range between 70° and 120°. Contact angles of less than 70° provide insufficient corrosion resistance and poor runnability for actual applications. Output is reduced beyond a practically acceptable level when the contact angle exceeds 120°.

The topcoat films have a thickness of about 5 Å to about 100 Å. The film thickness may be measured by means of an ellipsometer.

The substrates used in the practice of the present invention are not particularly limited as long as they are non-magnetic. Preferred are flexible substrates, particularly of such resins as polyesters, polyimides, and polypropylene. The thickness of substrates may vary, but is preferably from 5 $\mu$m to 20 $\mu$m.

The magnetic layer is formed on one major surface of a substate and preferably, a backcoat layer is formed on the opposite major surface or back surface thereof.

The magnetic recording media of the present invention are very useful in video, audio, and computer applications. Since the topcoat film of the media is formed on the magnetic metal layer by sputtering or ion plating a fluorocarbon resin, the topcoat film is firmly adhered to the magnetic layer. The adherence become stronger when metal atoms of the magnetic layer are chemically combined with fluorine atoms of the topcoat film in proximity to the interface therebetween. The presence of fluorine contributes to corrosion resistance. There are thus obtained magnetic recording media charcterized by improved corrosion resistance and minimized head clogging.

EXAMPLES

In order that those skilled in the art will better understand the practice of the present invention, examples of the invention are given below by way of illustration and not by way of limitation.

EXAMPLE 1

Using a cobalt-nickel alloy having a Co/Ni ratio of 4/1 by weight, a magnetic layer of 0.2 μm thick was formed on a polyethylene terephthalate (PET) web of 10 μm thick by the standard oblique evaporation technique, obtaining sample A0. In the oblique evaporation, the incident angle was set to 45° and the evaporation atmosphere had an argon partial pressure $P_{Ar}$ equal to $2 \times 10^{-2}$ Pa and an oxygen partial pressure $P_{O2}$ equal to $1 \times 10^{-2}$ Pa.

The resulting magnetic layer had a composition corresponding to that of the starting alloy and an atomic ratio of O/(Co+Ni) of 0.2 and was composed of coalesced columnar crystal particles each grown throughout the thickness of the layer, extending at an angle of about 40° with respect to a normal to the substrate major surface, and having a breadth of 0.01 μm.

It was observed by Auger spectral analysis with ion etching that the magnetic layer had the profile that Co was poorer in the proximity of the surface and O was chemically shifted and richer in the proximity of the surface. It was also observed that O was present chemically combined with the metals on the surface of columnar particles.

On the magnetic layer of samples A0, topcoat films containing fluorine and carbon were formed by RF sputtering using the following fluorocarbon resins as a target. The source materials used as the target in sputtering were PTFE (trade name, Polyfron TFE, manufactured by Daikin Industries K.K.), FEP (trade name, Teflon FEP, manufactured by duPont), and ETFE (trade name, Aflon COP, manufactured by Asahi Glass K.K.). The resin targets had dimensions of about 30 cm by 30 cm. The sputtering conditions were suitably selected for each resin in the ranges of sputtering power of 1 to 4 kW, operating pressure of $10^{-2}$ to 1 Pa, and line speed of 5 to 100 m/min. The inert gas atmosphere used in sputtering was argon.

In this way, topcoat films of 10 Å thick having the contact angle with water indicated in Table 1 were formed on the magnetic layers, obtaining samples A1 to A4.

The composition of the topcoat films was identified by the chemical shift in ESCA and the IR analysis of samples prepared in stationary state.

For comparison purposes, sample A5 was prepared by coating a PTFE telomer (trade name Vydax, manufactured by duPont) on a similar magnetic layer (coating thickness 10 Å), and sample A6 was prepared by forming a sputtered film (10 Å thick) on a similar magnetic layer using polyethylene as a target. The topcoat-free sample, that is, sample A0 was used as a control.

These samples were tested for corrosion resistance and head clogging.

Corrosion resistance

Each sample was allowed to stand for seven days at 60° C and 90% RH. Saturated magnetic flux density was measured before and after aging to determine a percent reduction of saturated magnetic flux density per square centimeter, $-\Delta\phi m/\phi m$ (%).

clogging

Each sample was processed into a standard 30 minute recording tape. A commercial VTR video deck of VHS type was loaded with the tape and operated 100 passes during which the occurrence of clogging was counted.

TABLE 1

| Sample No. | Target resin | (Sputtering) Topcoat film | | $-\Delta\phi m/\phi m$ (%) | Cloggings (/100 passes) |
| | | F/C (atom) | Contact angle (°) | | |
| --- | --- | --- | --- | --- | --- |
| A0* | — | — | 30 | 30 | 10 |
| A1 | PTFE | 1.80 | 85 | 4 | 1 |
| A2 | PTFE | 1.75 | 90 | 4 | 0 |
| A3 | FEP | 1.85 | 100 | 5 | 1 |
| A4 | ETFE | 1.35 | 100 | 5 | 1 |
| A5* | PTFE telomer coated | 1.45 | 110 | 20 | uncountable (frequent clogging) |
| A6* | PE | 0 | 60 | 28 | uncountable (frequent clogging) |

*comparative examples

EXAMPLE 2

Samples A0 were prepared by repeating the same procedure as in Example 1.

On the magnetic layer of samples A0, topcoat films containing fluorine and carbon were formed by ion plating using a fluorocarbon resin as an evaporation source. The source material evaporated in ion plating was PTFE (trade name, Polyfron TFE, manufactured by Daikin Industries K.K.). The ion plating conditions include an ionization voltage of 40 to 60 V, a chamber operating pressure of 0.1 to 1 Pa, and a substrate temperature of 30° C.

In this way, topcoat films of 10 Å thick having the contact angle with water indicated in Table 1 were formed on the magnetic layers, obtaining samples B1 to B2.

The composition of the topcoat films was identified by the chemical shift in ESCA and the IR analysis of samples prepared in stationary state.

For comparison purposes, sample B3 was prepared by sputtering the same fluorocarbon resin PTFE (trade name, Polyfron TFE, manufactured by Daikin Industries K.K.) on a similar magnetic layer (that is, sample B3 is substantially equal to samples A1 and A2). Sample B4 was prepared by evaporating a PTFE telomer (trade name Vydax, manufactured by duPont) on a similar magnetic layer. Sample B5 was prepared by coating the same PTFE telomer on a similar magnetic layer. The topcoat-free sample, that is, sample A0 was used as a control.

These samples were tested for corrosion resistance and head clogging. The tests are the same as those used in Example 1 except that the samples were operated 200 passes in the head clogging test.

The results are shown in Table 2.

TABLE 2

| Sample No. | Target source | Film formation | (Ion plating) Topcoat film F/C (atom) | Contact angle (°) | $-\Delta\phi m/\phi m$ (%) | Cloggings (/200 passes) |
|---|---|---|---|---|---|---|
| A0* | — | — | — | 30 | 30 | 20 |
| B1 | PTFE | ion plating | 1.95 | 110 | 4 | 0 |
| B2 | PTFE | ion plating | 1.95 | 105 | 3 | 0 |
| B3 | PTFE | sputtering | 1.80 | 90 | 4 | 2 |
| B4* | PTFE telomer | evaporation | 2.00 | 110 | 10 | 2 |
| B5* | PTFE telomer | coating | 2.00 | 110 | 20 | uncountable |

*comparative examples

EXAMPLE 3

Samples A0 were prepared by repeating the same procedure as in Example 1.

On the magnetic layer of samples A0, topcoat films containing fluorine and carbon were formed by sputtering and ion plating using the following fluorocarbon resins as a target or evaporation source.

The source materials used as the target in sputtering were PTFE (trade name, Polyfron TFE, manufactured by Daikin Industries K.K.) and FEP (trade name, Teflon FEP, manufactured by duPont). The sputtering conditions were suitably selected for each resin in the ranges of sputtering power of 5 to 8 kW, operating pressure of $10^{-2}$ to 1 Pa, and line speed of 5 to 50 m/min. The inert gas atmosphere used in sputtering was argon.

In this way, topcoat films of 10 Å thick having the contact angle with water indicated in Table 3 were formed on the magnetic layers, obtaining sample Nos. 11 to 15. It is to be noted that sample Nos. 13 and 15 were prepared using a lower sputtering power of 2 kW.

The composition of the topcoat films was identified by the chemical shift in ESCA and the IR analysis of samples prepared in stationary state.

Separately, topcoat films containing fluorine and carbon were formed on the magnetic layer of samples A0 by ion plating using a fluorocarbon resin as an evaporation source. The source material evaporated in ion plating was PTFE (trade name, Polyfron TFE, manufactured by Daikin Industries K.K.). The ion plating conditions include an ionization voltage of 80 V (sample No. 21) and 50 V (sample No. 22), an operating pressure of 0.01 to 0.1 Pa, a line speed of 5 to 50 m/min., and a substrate temperature of 40 to 60° C.

In this way, topcoat films of 10 Å thick having the contact angle with water indicated in Table 3 were formed on the magnetic layers, obtaining sample Nos. 21 and 22.

The composition of the topcoat films was identified by the chemical shift in ESCA and the IR analysis of samples prepared in stationary state.

For comparison purposes, sample No. 31 was prepared by coating a PTFE telomer (trade name Vydax, manufactured by duPont) on a similar magnetic layer, and sample No. 32 was prepared by evaporating the same PTFE telomer onto a similar magnetic layer. These topcoat films were 10 Å thick. The topcoat-free sample, that is, sample A0 was used as a control.

These samples were tested for fluorine-metal bond ratio, still life, corrosion resistance, and head clogging.

Fluorine-metal bond ratio

With ion etching with Ar, each sample was analyzed by ESCA to count the chemical shift (783.2 eV) of Co-F bond and that (292.2 eV) of F—C bond at the interface between the topcoat film and the magnetic layer. Using these counts, the ratio F—M/F—C was calculated where M is metal (Co in this example).

Still life

Each sample was processed into a standard recording tape. A commercial VTR video deck was loaded with the sample and operated in the still mode to measure the time taken until the reproduced still image disappeared.

Corrosion resistance

Each sample was allowed to stand for seven days at 60° C and 90% RH. Saturated magnetic flux density was measured before and after aging to determine a percent reduction of saturated magnetic flux density per square centimeter, $-\Delta\phi m/\phi m$ (%).

Clogging

Each sample was processed into a standard 30 minute recording tape. A commercial VTR video deck of VHS type was loaded with the tape and operated 200 passes during which the occurrence of clogging was counted.

The results are shown in Table 3.

TABLE 3

| Sample No. | Film forming process | Evaporation source or target | Topcoat film F/C (atom) | F-M/F-C | Thickness (Å) | Contact angle (°) | Still life (min) | $-\Delta\phi m/\phi m$ (%) | Cloggings (/200 passes) |
|---|---|---|---|---|---|---|---|---|---|
| A0* | — | — | — | — | — | — | 5 | 30 | 20 |
| 11 | sputtering | PTFE | 1.85 | 0.3 | 10 | 80 | >60 | 2 | 0 |

TABLE 3-continued

| Sample No. | Film forming process | Evaporation source or target | Topcoat film | | | | Still life (min) | $-\Delta\phi m/\phi m$ (%) | Cloggings (/200 passes) |
| | | | F/C (atom) | F-M/F-C | Thickness (Å) | Contact angle (°) | | | |
| --- | --- | --- | --- | --- | --- | --- | --- | --- | --- |
| 12 | sputtering | PTFE | 1.80 | 0.3 | 10 | 85 | >60 | 2 | 0 |
| 13 | sputtering (2 kW) | PTFE | 1.80 | 0 | 10 | 85 | 10-15 | 4 | 2 |
| 14 | sputtering | FEP | 1.90 | 0.4 | 10 | 95 | >60 | 2 | 0 |
| 15 | sputtering (2 kW) | FEP | 1.90 | 0 | 10 | 100 | 10-15 | 5 | 2 |
| 21 | ion plating (80 V) | PTFE | 1.95 | 0.5 | 10 | 105 | >60 | 2 | 0 |
| 22 | ion plating (50 V) | PTFE | 1.95 | 0 | 10 | 110 | 10-15 | 4 | 0 |
| 31* | coating | PTFE telomer | 2.00 | 0 | 10 | 100 | 5-10 | 20 | uncountable |
| 32* | evaporation | PTFE telomer | 2.00 | 0 | 10 | 110 | 10-15 | 10 | 2 |

*comparative examples

We claim:

1. In a magnetic recording medium having improved corrosion resistance and minimum head clogging comprising a non-magnetic substrate, a magnetic metal layer of continuous thin film type deposited on the substrate, and a topcoat film on the magnetic layer, the improvement wherein the topcoat film has a thickness of about 5 Å to about 100 Å and has a contact angle with water between 70° and 120° and consists essentially of flourine and carbon in an atomic ratio of flourine to carbon in the range of 0.5:1 to 3:1 formed by sputtering or ion plating a flourocarbon resin, and flourine atoms of the topcoat film are chemically combined with metal atoms of the magnetic layer in proximity to the interface between the topcoat film and the magnetic layer.

* * * * *